L. J. SEVISON & E. H. MOAK.
GRADING MACHINE.
APPLICATION FILED DEC. 26, 1906.

973,711.

Patented Oct. 25, 1910.
9 SHEETS—SHEET 1.

Witnesses
O. W. Holmes
Thos. R. Heath

Inventors:
E. H. Moak
By L. J. Sevison
Sheldon & Wood
Attorneys

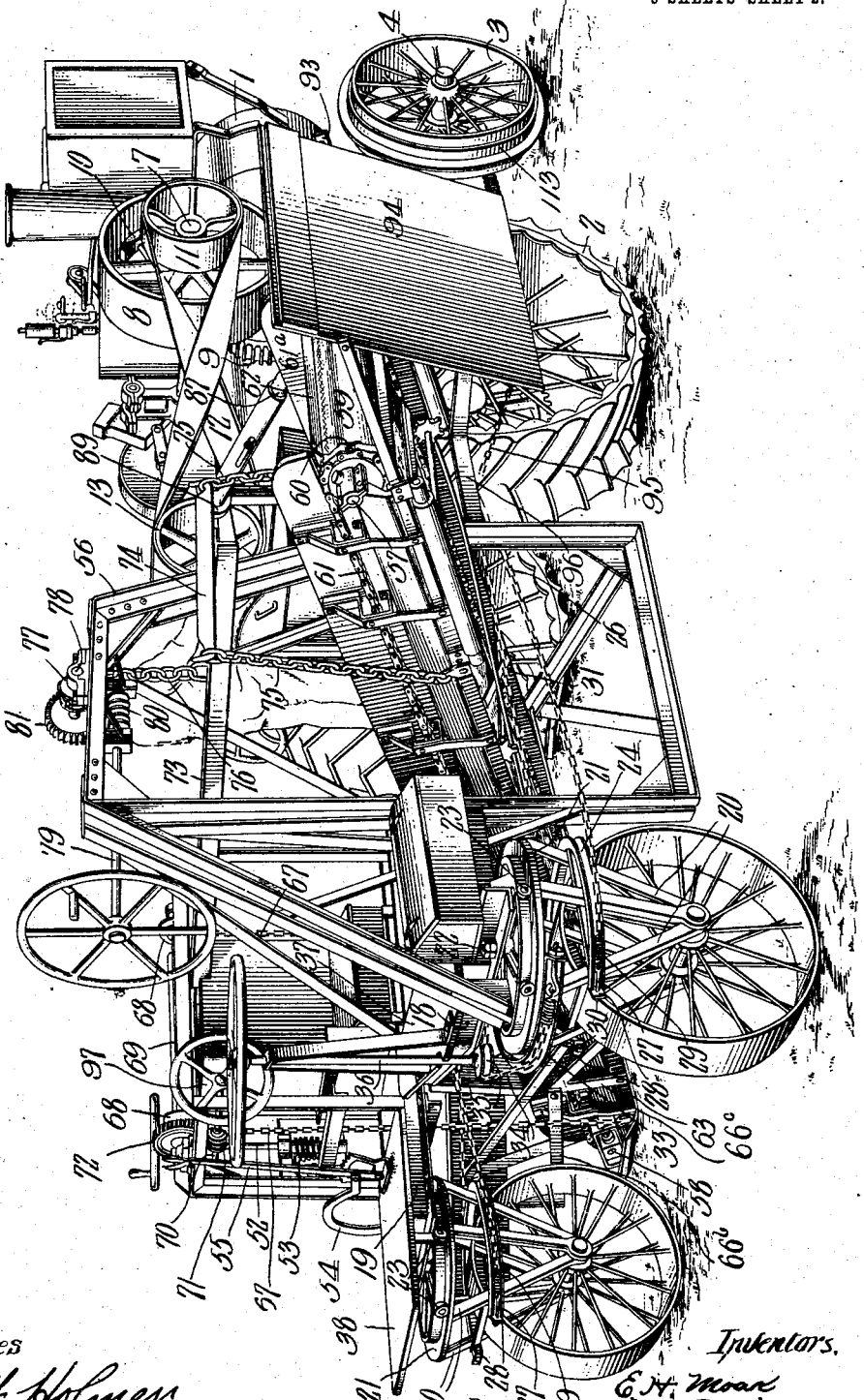

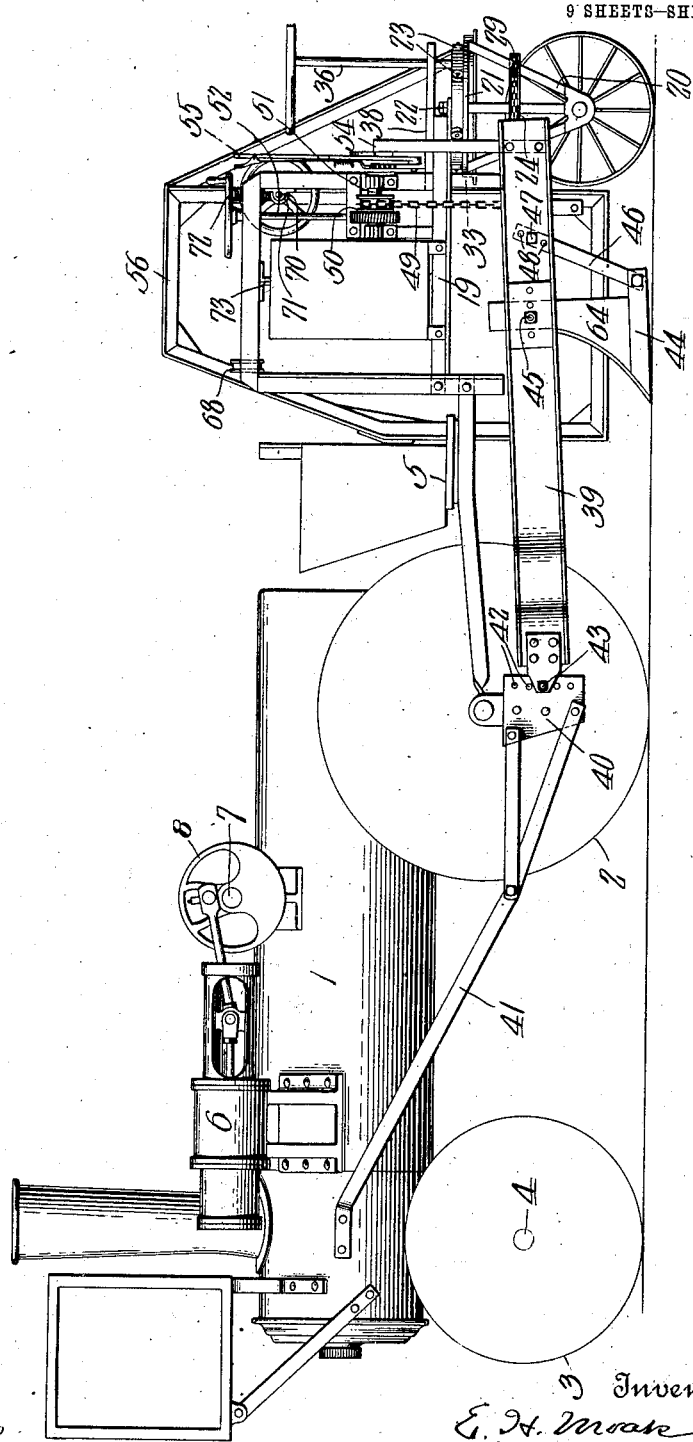

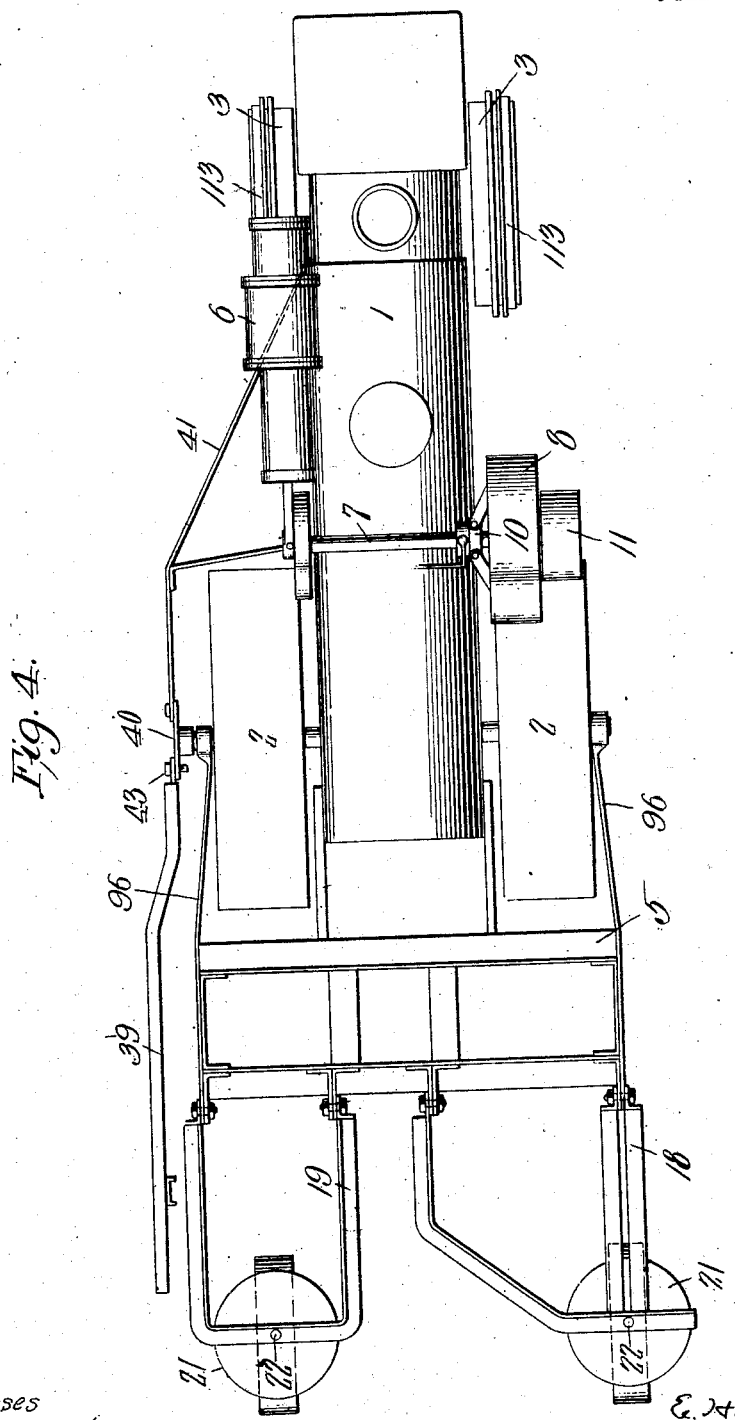

L. J. SEVISON & E. H. MOAK.
GRADING MACHINE.
APPLICATION FILED DEC. 26, 1906.
973,711.
Patented Oct. 25, 1910.
9 SHEETS—SHEET 5.
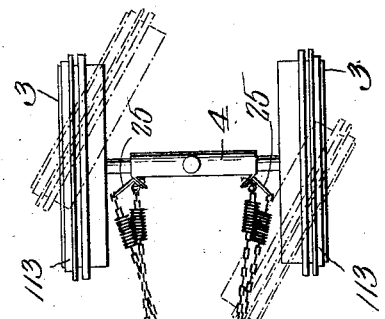
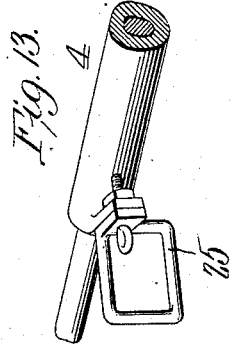
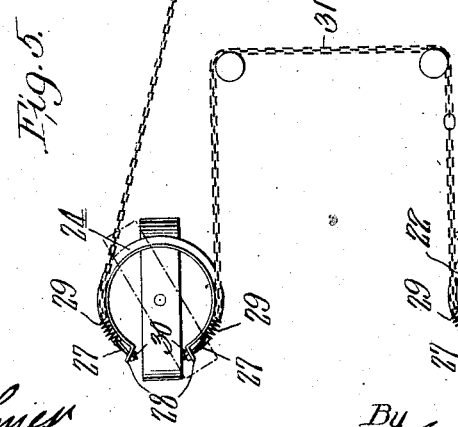
Witnesses
O. W. Holmes
Thos. R. Heath
Inventors
E. H. Moak
L. J. Sevison
By Sheldon A. Wood Attorneys
THE NORRIS PETERS CO., WASHINGTON, D. C.

L. J. SEVISON & E. H. MOAK.
GRADING MACHINE.
APPLICATION FILED DEC. 26, 1906.

973,711.

Patented Oct. 25, 1910.
9 SHEETS—SHEET 6.

Witnesses
O. H. Holmes
Thos. R. Strath.

Inventors
E. H. Moak
L. J. Sevison
by Sheldon & Wood Attorneys

THE NORRIS PETERS CO., WASHINGTON, D. C.

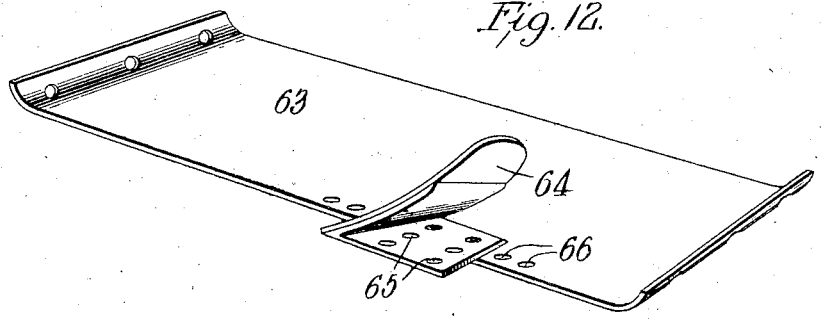
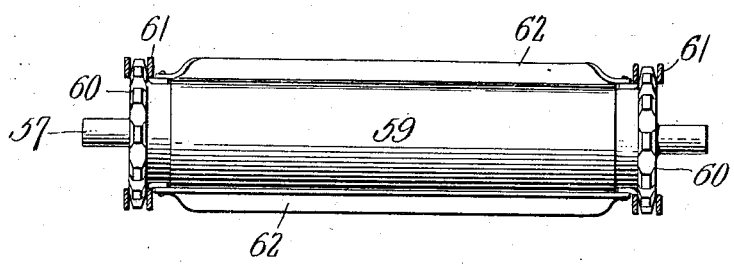
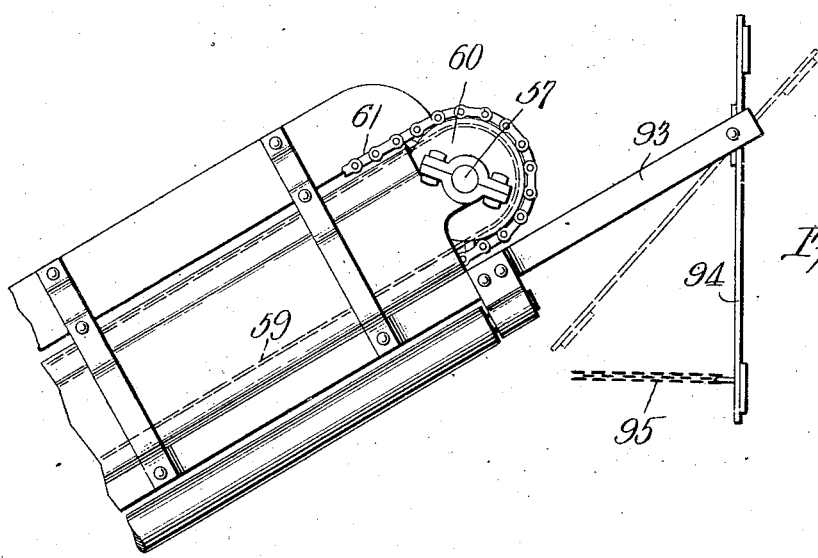

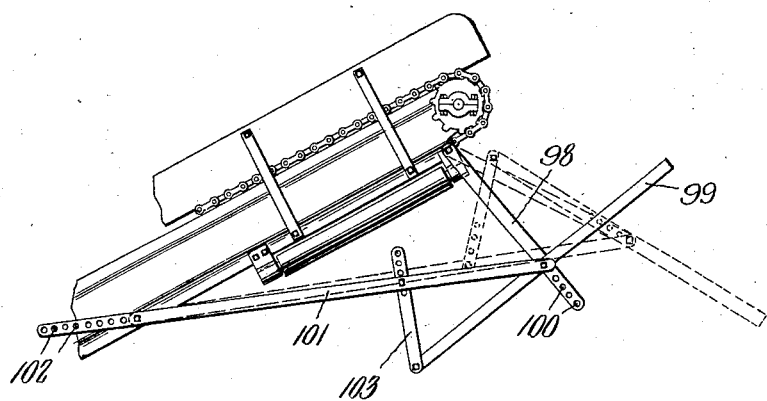
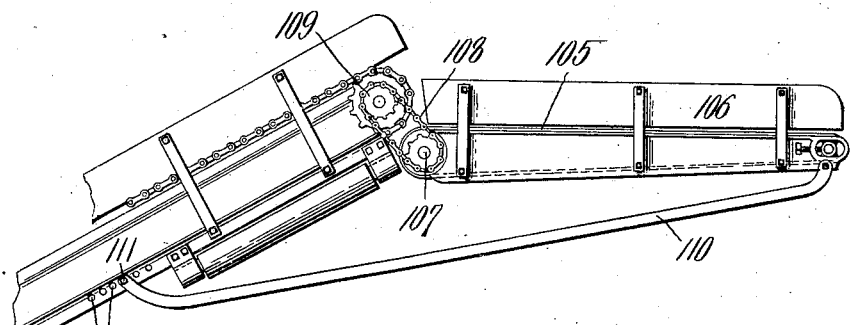
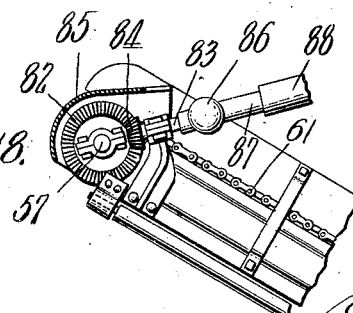

L. J. SEVISON & E. H. MOAK.
GRADING MACHINE.
APPLICATION FILED DEC. 26, 1906.

973,711.

Patented Oct. 25, 1910.

9 SHEETS—SHEET 9.

Witnesses
O. W. Holmes
Tho. R. Heath

Inventors
E. H. Moak
L. J. Sevison
by Sheldon A. Wood
Attorney

UNITED STATES PATENT OFFICE.

LUTHER J. SEVISON AND EUGENE H. MOAK, OF PORT HURON, MICHIGAN.

GRADING-MACHINE.

973,711.  Specification of Letters Patent.  Patented Oct. 25, 1910.

Application filed December 26, 1906. Serial No. 349,565.

*To all whom it may concern:*

Be it known that we, LUTHER J. SEVISON and EUGENE H. MOAK, citizens of the United States, residing at Port Huron, in the county of St. Clair and State of Michigan, have invented certain new and useful Improvements in Grading-Machines, of which the following is a specification.

This invention relates to an improvement in grading machines, and more particularly to machines of this character in which a traction engine operates in conjunction with a plow and elevating mechanism.

The object of the present invention is the provision in a machine of this character of means for applying the power directly from the engine to the elevating mechanism.

A further object of the invention is the provision of means permitting the actuation of the elevator while the machine is at rest.

A further object of the invention is the provision of means for flexibly supporting the plow and elevating mechanism so that the machine may be used with equal facility on rough or even ground.

A further object of the invention is the provision of improved steering mechanism for the machine whereby the same may be readily propelled in either a forward or backward direction or may be turned in a very short space.

Other objects of the invention will be apparent from the detailed description hereinafter when read in connection with the accompanying drawings forming a part hereof.

Figure 1:
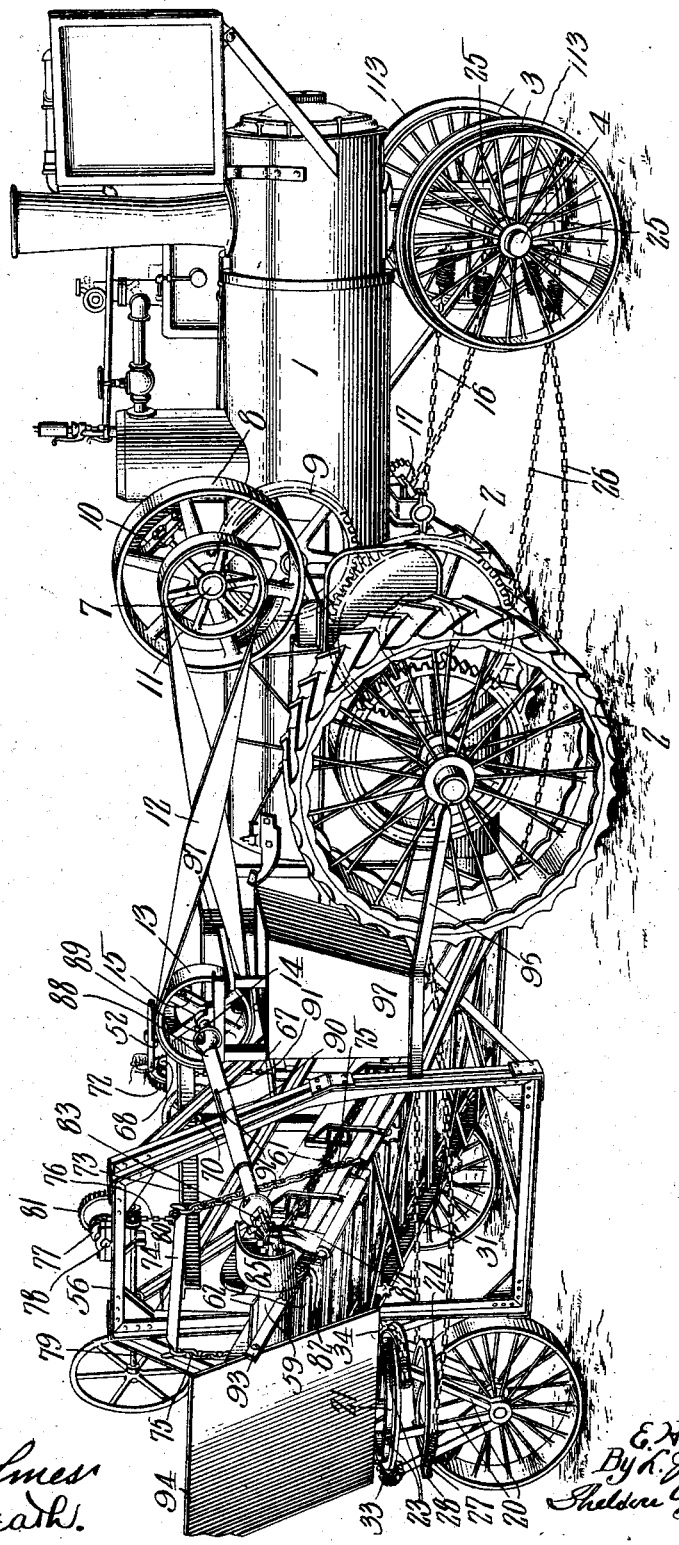
Figure 6:
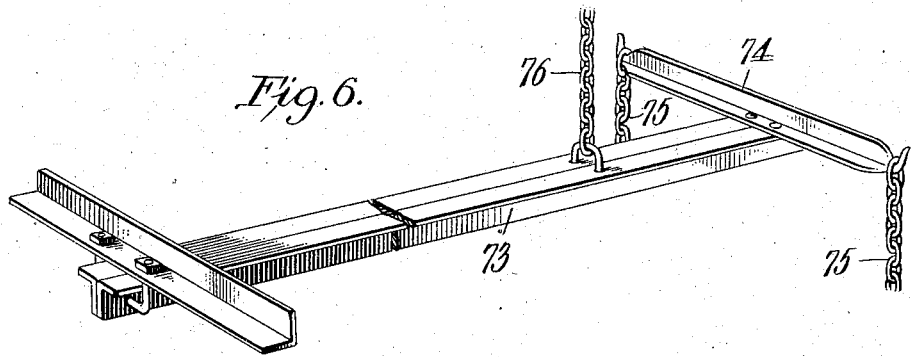
Figure 17:
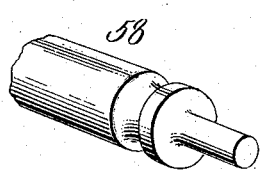
Figure 19:
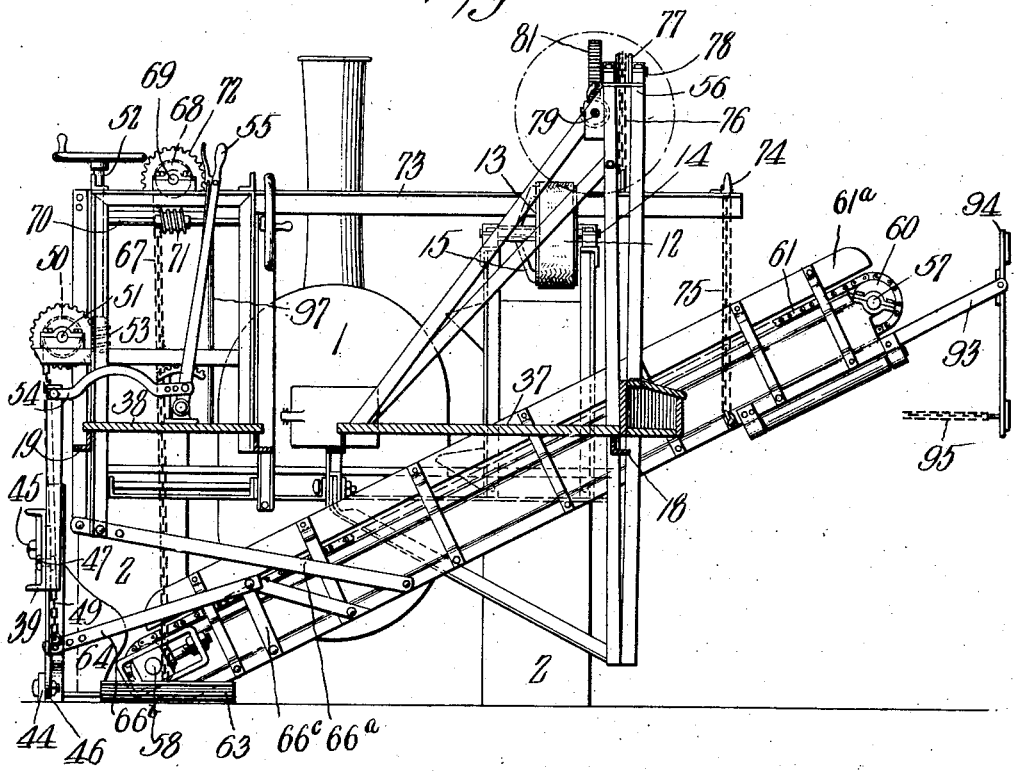
Figure 20:
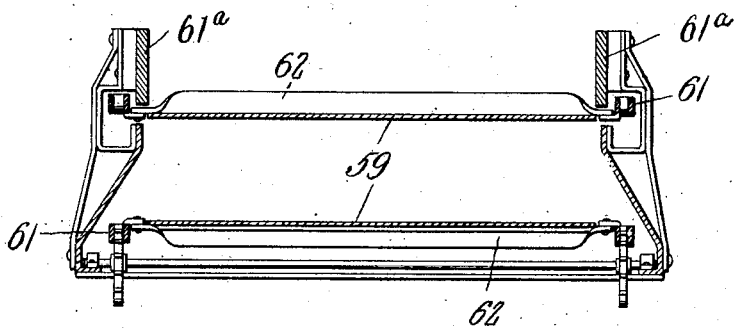

In the drawings: wherein a preferable embodiment of our invention is shown and wherein like numerals of reference refer to similar parts in the several views, Figure 1 is a perspective view of our improved machine. Fig. 2 is a perspective view of the machine taken from a different point. Figs. 3 and 4 are diagrammatic views of the traction engine and the truck for supporting the plow and elevating mechanism. Fig. 5 is a diagrammatic view of the steering mechanism. Fig. 6 is a detail view of the beam used to support the forward end of the elevating mechanism. Figs. 7, 8, 9, 10 and 11 are detail views of the elevating mechanism. Fig. 12 is a detail view of the shoe for the lower end of the elevating mechanism. Fig. 13 is a detail view of one of the clips employed for connecting the forward axle of the traction engine with the steering wheels of the plow and elevator trucks. Fig. 14 is a detail view of a traction tire, which is designed to be secured to the wheels of the engine. Fig. 15 is a detail view of a modified form of deflector board which is designed to be secured to the discharge end of the elevating mechanism, and Fig. 16 is a detail view of an elevator extension, which is designed to be secured to the discharge end of the elevator. Fig. 17 is a detail view of one end of the lower carrier roller. Fig. 18 is a detail view showing the gearing for driving the elevating carrier. Fig. 19 is a cross section through the supporting trucks, the carrier being shown in elevation, and Fig. 20 is a transverse section of the elevating carrier.

Referring now more particularly to the drawings, 1 designates a traction engine, which may be of any usual construction, and which is provided with the usual supporting wheels 2 and with the steering wheels 3, which are mounted upon the axle 4, which is pivoted in the usual manner. The traction engine is also provided with a suitable platform 5 in rear thereof affording a support for an operator. Suitably mounted upon the traction engine is a steam engine 6 which is designed to impart rotation to the shaft 7, which is journaled in suitable bearings supported upon the traction engine proper. Loosely mounted upon the shaft 7 is a flywheel 8, and a clutch 10, which latter is connected by a train of gears 9 with the driving wheels 2 of the traction engine. The clutch 10 is of any desired construction and is adapted to engage the fly-wheel 8 to run therewith with the engine shaft 7 or to stand idle. Rigidly secured to the engine shaft 7 is a drive pulley 11 which is connected by a belt 12 or other suitable gearing with a pulley 13 which is loosely mounted on a transversely disposed shaft 14, which is journaled in a suitable bearing or bearings supported upon the platforms of the traction engine. A clutch 15 of any suitable construction is utilized to connect the pulley 13 with the shaft 14 when desired. The steering of the traction engine is effected in the usual manner by a chain 16, which is wound upon a shaft 17 and the extremities of which are connected to the front axle 4 at opposite sides of its pivotal point, the shaft 17 being actuated by a shaft geared thereto and a steering wheel positioned so as to be accessible to an operator when occupying the platform of the engine, as is usual in machines of this character.

Pivotally secured to the rear of the traction engine platform 5 and arranged side by side are two trucks 18 and 19, which are designed to support the plow and elevating mechanism of the machine. Each of the trucks 18 and 19 comprises a frame which is pivotally mounted at its forward end to the platform 5 so as to be capable to move in a vertical plane and which is provided at its rear end with a caster wheel. From this construction it will be apparent that the trucks are free to move in a vertical plane independently of each other and of the traction engine so as to compensate for any inequalities in the surface of the ground on which the machine is being used. The caster wheels of the trucks 18 and 19 are journaled in the lower ends of suitable brackets or arms 20 which are rigidly secured to and depend from turn-tables 21. The turn-tables 21 are rotatably secured by means of suitable pivot bolts 22 to the rear ends of the frames of the trucks 18 and 19 and are designed to work against roller bearings 23, which are journaled on the peripheries of circular plates carried by said frames. Carried by the brackets 20, which form the supports for the caster wheels of the trucks 18 and 19, are the substantially ring-shaped channels 24. Bolted to the opposite extremities of the forward supporting axle 4 of the traction engine are loops 25 to which are secured the ends of chains 26. The chains 26 are crossed and the rear ends thereof are arranged to occupy the outer portions of the ring-shaped channels 24 carried by the brackets forming the supports for the caster wheels of the trucks 18 and 19. The ends of the chains 26 are preferably secured to the channels 24 by means of bolts 27, which are secured to the ends of said chains and pass through apertured ears 28 carried by said channels, the projecting ends of said bolts having threaded thereon nuts 30. Coiled springs 29 are preferably interposed between the inner ends of the bolts 27 and the ends of the chains 26, said springs serving to maintain the chains 26 at the proper tension. The inner adjacent portions of the channels 24 are occupied by the ends of a chain 31, which traverses idlers secured to the under side of the truck frames. The ends of the chain 31 are secured to the channels 24 in the same manner in which the ends of the chains 26 are attached thereto, similar springs being provided for maintaining the same at the proper tension. If desired the chain 26 can be provided with a turn-buckle or other suitable adjusting device intermediate the ends thereof for varying the length thereof.

From the above described construction it will be apparent that when the forward axle 4 of the traction engine is shifted to steer the machine, the caster wheels of the trucks 18 and 19 will be simultaneously shifted to assist in the steering of the machine. It will also be obvious that by reason of this construction the machine may be readily propelled in either direction and may be turned in a very short space. In view of the difficulty of steering the machine with a single hand wheel, by reason of the great weight thereof, a supplemental steering attachment is provided so that the steering may be effected either by two operators simultaneously, or from two different points of the machine. In the present embodiment of our invention the supplemental steering mechanism is designed to be applied to the caster wheel of one of the trucks utilized for supporting the plow and elevating mechanism and to be actuated by an operator standing on the platform of said truck, and consists of a substantially ring-shaped member 33, which is carried by the brackets or arms 20 forming the support for the caster wheel, in which are secured the ends of a chain 34 which passes around and engages a sheave 35, which is secured to the lower end of a vertically disposed staff 36 which is journaled in suitable bearings carried by the truck frame. The staff 36 is provided with a suitable operating handle or wheel accessible to an operator occupying the platform of the truck. From this construction it will be apparent that by rotating the staff 36 the caster wheel may be turned in any desired direction and with it the caster wheel of the other truck and the front axle of the traction engine.

The trucks 18 and 19 are provided respectively with platforms 37 and 38 affording supports for the operator of the machine. Positioned just beyond the outside of the truck 19 is the plow beam 39, which is pivotally connected at its forward end to a bracket 40 depending from the rear axle of the traction engine, said bracket being held against movement by means of a brace 41, which extends forwardly therefrom and is rigidly secured at its forward end to the boiler of the traction engine. The bracket 40 is provided along its rear edge with a plurality of vertically disposed apertures 42 and the plow beam 39 is provided at its forward end with a pivot bolt 43, which is designed to be secured in either of the apertures 42, so that the depth of cut of the plow may be regulated at will. A plow 44 is pivotally secured to the beam 39 by means of a pivot bolt 45, said beam being preferably provided with a plurality of apertures adapted to receive said pivot bolt, so that the plow may if desired be adjusted longitudinally of the beam. The plow is maintained in a rigid position by means of a brace 46 which extends upwardly from the heel thereof and is bolted to the beam 39 by a pivot bolt 47, which is adapted to be secured in any one of a series of apertures 48 in the plow beam according to the angle at which it is desired to set the plow. The pivot bolt 47 is formed of some easily fracturable material so that in the event of the plow contacting with any obstruction, it will break and permit the plow to ride over said obstruction.

Vertical adjustment of the plow beam 39 is effected by means of a chain 49, which is secured thereto at its lower end and passes over a sheave 50 which is fashioned to engage the links thereof and is carried by a shaft 51 journaled in suitable bearings mounted on the frame of the truck 19. Movement is imparted to the drum or sheave 50 by means of an actuating staff 52, which is journaled in suitable bearings mounted in the frame of the truck 19 and is provided with a worm 53 which meshes with a worm wheel secured to the shaft 51. The actuating staff 52 is provided with a suitable hand wheel positioned so as to be accessible to an operator occupying the platform 38 of the truck 19. The plow beam 39 is held against lateral movement by means of an arm 54, the upper end of which is bent inwardly and is pivotally connected to a transversely swinging lever 55, which is pivotally mounted upon the platform 38. The lever 55 is mounted to swing transversely of the platform to permit the desired vertical adjustment of the plow beam, any suitable means being provided for maintaining the lever in its various positions of adjustment. Inasmuch as the forward end of the plow beam is secured to the bracket depending from the rear axle of the traction engine just at one side of one of the supporting wheels, it is obvious that no beam wheel, such as is usually employed in devices of this character need be used with this machine.

Figure 7:
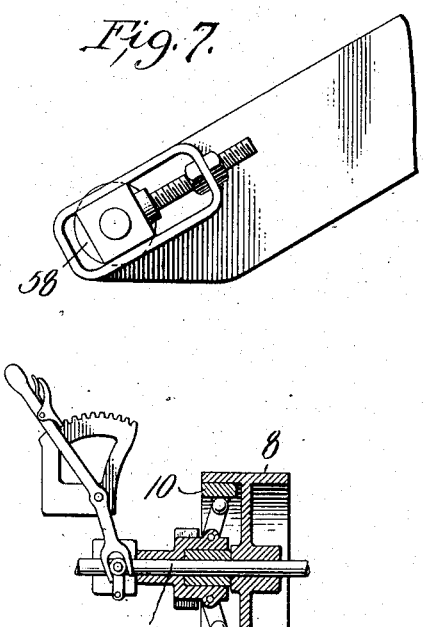
Figure 8:
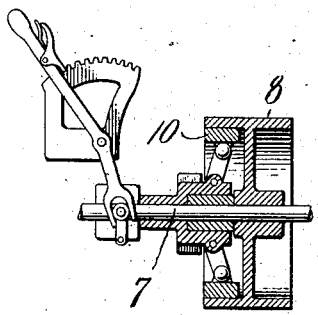
Figure 9:
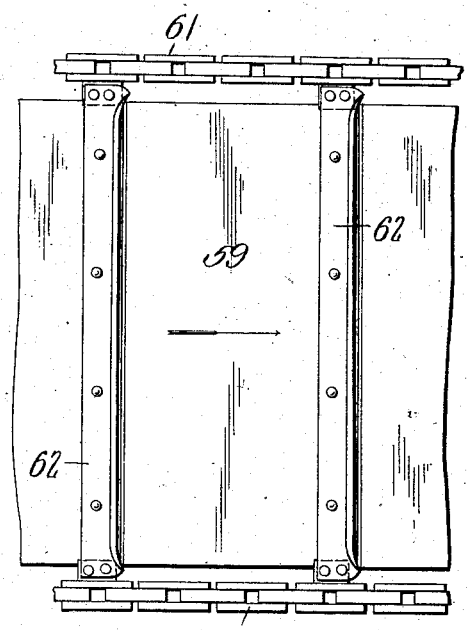

The elevating mechanism is supported by both the trucks 18 and 19, the forward end of said elevating mechanism being supported by the truck 18, and the rear end by the truck 19. The elevating mechanism, which is in the form of an endless carrier, is supported transversely of the machine, the frames of the trucks 18 and 19 being so fashioned as to permit said carrier to be adjusted vertically to various positions. The frame of the truck 18 is provided with an arched portion 56 through which the forward or delivery end of the elevator projects, said arched portion being high enough to permit a wide range of vertical adjustment for the delivery end of the carrier. The elevator comprises the longitudinally arranged side bars in the forward and rear ends of which are journaled the rollers 57 and 58, which serve to support the belt or apron 59. The shaft carrying the upper roll 57 has secured thereto sprocket wheels 60, slightly larger in diameter than the roll, around which pass sprocket chains 61, the lower ends of which travel around smooth collars secured to the ends of the shaft carrying the lower roller 58. The bearings for the lower roller 58 are preferably secured in slots formed in the side bars of the elevator frame so that they may be moved longitudinally by any suitable adjusting means to take up any slack in the apron 59, as shown in Fig. 7. Secured to the apron 59 at regular intervals are the slats 62. The slats 62 are arranged transversely of the apron 59 and the ends thereof project beyond the edges of said apron and are either formed integral with or rigidly secured to certain of the links of chains 61 so that the apron 59 is positively carried by the slats and the strain thereon is thereby greatly reduced. The carrier is provided with supplemental side bars 61ª which are positioned just above the upper run of the web 59 and inside of the drive chains 61, said supplemental side bars being supported by suitable brackets from the side bars of the carrier frame. The lower edges of the supplemental side bars 61ª extend in close proximity to the web of the apron 59 so that said supplemental side bars act as a guide for the material on the belt and also as a means for preventing the material from contacting with and clogging the drive chains. The lower end of the carrier is provided with a flat metallic shoe 63 which is designed to slide over the ground when the machine is in operation. The shoe 63 is arranged to underlie the lower end of the carrier and the ends thereof are secured in any suitable manner to the side bars of said carrier. The shoe 63 projects slightly beyond the lower end of the carrier and adjustably secured to the upper side of the projecting portion of said shoe is a mold board 64 which is designed to receive the material excavated by the plow 44 and deliver the same on to the apron 59. The base of the mold board 64 is provided with a plurality of apertures 65 therein, any two of which may be brought into registration with any two of a series of apertures 66 formed in the shoe 63 and suitable fastening bolts passed therethrough, so that the mold board may be adjusted longitudinally and laterally of the shoe to accord with the adjustment which has previously been given to the plow.

The lower end of the carrier is supported by means of links 66ª which are pivotally connected at their rear ends to the side bars of the carrier frame, adjacent their lower ends and at their upper ends with suitable portions of the truck frame 19, the connections of the links with the truck frame being preferably adjustable. The links 66ª permit the carrier to normally rest with its shoe 63 in contact with the ground and at the same time allow the lower end of said carrier to be elevated when the machine is not in use. The lower end of the carrier is elevated when the machine is not in use by means of chains 57, the lower ends of which are secured in any suitable manner to the side bars of the carrier and the upper ends of which pass over sheaves or drums 68, which are fashioned to engage the links of the chains, and which are secured to a shaft 69 journaled in suitable bearings mounted in the upper part of the frame of the truck 19. Rotation is imparted to the shaft 69 to raise the lower end of the carrier out of contact with the ground by means of a shaft 70, which is journaled in suitable bearings mounted in the frame of the truck 19 and which is provided with a worm 71, which meshes with a worm wheel 72 secured to the shaft 69.

To maintain the plow beam and carrier in the proper relative positions at all times an arm depending from said beam is pivotally connected by a link 66ᵇ with the upper end of a bracket 66ᶜ secured to one of the side bars of the carrier. The forward end of the link 66ᶜ is adjustably connected to the arm depending from the plow beam to allow for the necessary vertical adjustment which may be given to the plow beam and carrier. The shaft 70 is provided with a suitable operating wheel accessible to an operator occupying the platform 38. A beam 73 is pivotally connected at its rear end in any suitable manner to the frame of the truck 19 and extends through the arch-shaped portion 56 of the frame of the truck 18. Secured to the outer end of the beam 73 is a cross bar 74 from the extremities of which depend chains 75, which are secured at their lower ends in any suitable manner to the side bars of the carrier. The beam 73 is adjustably supported by means of a chain 76, which is secured thereto at its lower end and which passes over a sheave or drum 77, which is fashioned to engage the links of the chain and which is carried by a shaft 78 journaled in bearings secured to the top of the arch-shaped portion 56 of the frame of the truck 18. Rotary movement is imparted to the shaft 78 to effect the vertical adjustment of the delivery end of the carrier by means of a shaft 79 which is journaled in suitable bearings secured to the frame of the truck 18 and which is provided with a worm 80 which meshes with a worm wheel 81 carried by the shaft 78. The shaft 79 is provided with a suitable operating wheel or handles accessible to an operator occupying the platform 37. The cross bar 74 is preferably adjustably secured to the end of the beam 73 to compensate for the inequalities in weight of the opposite sides of the carrier, due to the gearing connecting the same with the steam engine mounted on the traction engine.

The shaft which carries the upper roller 57 of the carrier projects outwardly beyond one of the side bars of said carrier and has secured thereto a beveled gear 82. Journaled in a bearing secured to the outside of one of the side bars of the carrier adjacent the projecting end of the shaft carrying the roller 57 is a stub shaft 83, to which is secured a beveled gear 84 which meshes with the beveled gear 82. A casing or shield 85 incases the upper portion of the gear wheel 82 and serves to prevent the dirt discharged from the end of the carrier from coming into contact therewith. Secured to the end of the stub shaft 83 by means of a universal joint 86 is a shaft 87 which telescopically engages with a hollow shaft 88, the forward end of which is connected by a universal joint 89 with the transversely disposed shaft 14, which is journaled in bearings supported upon the platform 5 of the traction engine. The shaft 87 is free to move longitudinally with respect to the hollow shaft 88 and is caused to rotate therewith by means of a pin 90 which projects laterally therefrom and engages a longitudinal slot 91 formed in said shaft 88. To lessen the friction incident to the longitudinal movement of the shafts 87 and 88, the pin 90 is preferably provided with a friction roller 92, which contacts with the side walls of the slot 91 formed in the hollow shaft 88. From the above described construction it will be apparent that the elevating mechanism is constantly driven from the steam engine on the traction engine regardless of the vertical position to which it is adjusted.

Secured to the side bars of the carrier and projecting outwardly beyond the ends thereof are a pair of arms 93, between the outer ends of which is pivotally secured a deflector board 94. To the lower portion of the deflector board 94 is secured a chain 95, the free end of which is adapted to be adjustably secured in any suitable manner to one of the side bars of the carrier. From this construction it is obvious that by adjusting the chain 95 to the desired position, the deflector may be positioned to cause the material delivered by the carrier to be discharged either in a rearward direction or directly under the forward end thereof.

To relieve the platform 5 of the traction engine from the strain of the trucks 18 and 19, when the machine is drawn forward, said platform is strengthened by draw-bars 96, which are carried at their forward ends by the rear axle of the traction engine, and which are rigidly connected at their rear ends to the frame-work of the engine platform.

Positioned upon the engine platform and upon either or both of the trucks 18 and 19 are tanks 97, which may be used as coal bunkers or water tanks.

Secured to the under side of the side bars of the carrier are freely rotatable antifriction rollers which are adapted to engage with the upper edge of the side of a wagon or car when the machine is utilized for loading wagons and cars, such rollers serving to facilitate the travel of the carrier longitudinally of the wagon or car to effect the complete loading thereof. The rollers are preferably made of considerable length so that they will contact with the side of the wagon or car regardless of the exact position of the machine relative thereto.

In Fig. 15 is shown a modified form of deflector board. This embodiment of the invention comprises a pair of arms 98 which are pivotally secured at their upper ends in any suitable manner, to the side bars of the carrier adjacent the delivery end thereof, and in the lower end of which is pivoted a deflector board 99. The outer ends of the arms 98 are provided with a plurality of apertures 100 and the deflector board may be secured in any pair of said apertures by means of a suitable pivot pin. Extending rearwardly from one of the arms 98 is a link 101, the rear end of which is provided with a plurality of apertures 102 any one of which may be caused to engage a pin carried by one of the side bars of the carrier, to secure the deflector board in various positions of adjustment. The deflector board is held against movement by means of a link 103, one end of which is pivotally connected to said deflector board, and the other end of which is provided with a plurality of apertures, any one of which is adapted to be brought into engagement with a pin carried by the link 101, so that the deflector board may be set at any desired angle. From this construction, it is obvious that the deflector board may be either adjusted to cause the material elevated by the carrier to be discharged in rear of the delivery end of said carrier, or by reversing the position of the link 103 to be discharged in advance of the delivery end of the carrier.

In Fig. 16 of the drawings, is illustrated an extension attachment for the carrier to be used when it is desired to deliver the material at some distance from the delivery end of said carrier. This embodiment of the invention comprises an auxiliary belt carrier 105, which is mounted to travel on rollers journaled in the ends of a frame 106, which is pivotally connected in any suitable manner to the carrier adjacent the discharge end thereof. The shaft carrying the inner roller of the auxiliary carrier projects beyond the frame of said auxiliary carrier, and has secured thereto a sprocket wheel 107. A sprocket chain 108 connects the sprocket wheel 107 with a sprocket wheel 109 which is secured to one end of the shaft which carries the upper roller of the main carrier, so that the power which serves to drive the main carrier will also drive the auxiliary carrier. Pivotally secured to the outer end of the frame of the auxiliary carrier is an arm 110, the inner end of which is provided with a suitable locking pin 111, which is adapted to engage with any one of a series of apertures 112 formed in one of the side bars of the main carrier, so that the auxiliary carrier may be set at any desired angle.

We will not specifically claim the extension attachment above described in the present application, inasmuch as the same will constitute subject matter for a divisional application.

In Fig. 14 of the drawings is shown a traction rim 113, which is adapted to be bolted or otherwise secured to the peripheries of the front wheels of the traction engine and also to the peripheries of the caster wheels of the trucks 18 and 19, if desired.

Having thus described the invention, what is claimed is:—

1. In a machine of the character described, a traction engine, a plurality of independently movable trucks flexibly connected thereto, and elevating mechanism supported by said trucks.

2. In a machine of the character described, a traction engine, a pair of independently vertically movable trucks pivotally connected thereto, and elevating mechanism supported by said trucks.

3. In a machine of the character described, a traction engine including a power shaft and means for actuating the same, a plurality of independently movable trucks flexibly connected to the traction engine, elevating mechanism supported upon said trucks, and gearing connecting the power shaft of the traction engine and the elevating mechanism.

4. In a machine of the character described, a traction engine including a power shaft and means for actuating the same, a plurality of independently movable trucks flexibly connected to the traction engine, elevating mechanism supported upon said trucks, means for adjusting said elevating mechanism, and flexible gearing connecting the power shaft of the traction engine and the elevating mechanism.

5. In a machine of the character described, a traction engine including a power shaft and means for actuating the same, a pair of independently vertically movable trucks pivotally connected to said traction engine, a plow supported by one of said trucks, an elevating carrier supported by said trucks and positioned to receive the material from the plow, and gearing connecting the power shaft of the traction engine and the elevating carrier.

6. In a machine of the character described, a traction engine including a power shaft and means for actuating the same, a pair of independently vertically movable trucks pivotally connected to the traction engine, a plow supported by one of said trucks, an elevating carrier supported by said trucks and positioned to receive the material from the plow, means for adjusting the elevating carrier, and flexible gearing connecting the power shaft of the traction engine and the elevating mechanism.

7. In a machine of the character described, a traction engine including a power shaft and means for actuating the same, a pair of independently vertically movable trucks flexibly connected thereto, a plow supported by one of said trucks and positioned at one side thereof, an elevating carrier supported by said trucks and extending transversely thereof, means for vertically adjusting the elevating carrier, and gearing connecting the power shaft of the traction engine and the elevating carrier.

8. In a machine of the character described, a traction engine including a power shaft and means for actuating the same, a pair of independently vertically movable trucks flexibly connected to the traction engine, a plow supported by one of said trucks, elevating mechanism extending transversely of said trucks, means carried by said trucks for supporting the front and rear ends of said elevating mechanism, and gearing connecting the power shaft of the traction engine and the elevating mechanism.

9. In a machine of the character described, a traction engine including a power shaft and means for actuating the same, a pair of independently vertically movable trucks flexibly connected to said traction engine, a plow supported by one of said trucks, an elevating carrier extending transversely of said trucks, means carried by said trucks for adjustably supporting the front and rear ends of said elevating carrier, and flexible gearing connecting the power shaft of the traction engine and the elevating carrier.

10. In a machine of the character described, a traction engine including a power shaft and means for actuating the same, a pair of independently movable trucks flexibly connected to the traction engine, a plow beam pivotally connected at its forward end to the traction engine, means carried by one of said trucks for adjustably supporting said plow beam, an elevating carrier extending transversely of said trucks, means carried by said trucks for adjustably supporting said elevating carrier, and gearing connecting the power shaft of the traction engine and the elevating carrier.

11. In a machine of the character described, a traction engine including a power shaft and means for actuating the same, a truck flexibly connected to the traction engine, a plow beam pivotally connected at its forward end to the traction engine, means carried by said truck for adjustably supporting said plow beam, a plow secured to the plow beam, an elevating carrier positioned to receive the material excavated by the plow, and gearing connecting the power shaft of the traction engine and the elevating carrier.

12. In a machine of the character described, a traction engine including a power shaft and means for actuating the same, a pair of independently movable trucks flexibly connected to the traction engine, a plow supported by one of said trucks, elevating mechanism extending transversely of said truck, a beam pivotally connected at its rear end to the plow truck, means carried by the other truck for adjustably supporting the forward end of said beam and connections between the forward end of said beam and the forward end of the elevating carrier, and gearing connecting the power shaft of the traction engine and the elevating carrier.

13. In a machine of the character described, a traction engine, steering mechanism therefor, a grader truck flexibly connecting to said traction engine, steering mechanism for said truck, and connections between the steering mechanism of the traction engine and the steering mechanism of the grader truck.

14. In a machine of the character described, a traction engine provided with steering wheels, a grader truck connected to said traction engine and provided with a steering wheel, and means for simultaneously actuating the steering wheels of the traction engine and grader truck.

15. In a machine of the character described, a traction engine provided with a pivoted forward axle, a grader truck connected to the traction engine, a steering wheel for said grader truck, means for shifting the pivoted axle of the traction engine, and a connection between said axle and the steering wheel of the grader truck.

16. In a machine of the character described, a traction engine, steering mechanism therefor, a grader truck connected to the traction engine, a steering wheel for said grader truck, connections between the steering mechanism of the traction engine and the steering wheel of the grader truck, means for actuating the steering mechanism of the traction engine, and independent means for actuating the steering wheel of the grader truck.

17. In a machine of the character described, a traction engine, steering mechanism therefor, a plurality of independently movable grader supporting trucks connected to said traction engine, steering wheels for said trucks, means for actuating the steering mechanism of the traction engine, and means for simultaneously actuating the steering wheels of the trucks.

18. In a machine of the character described, a traction engine having a pivoted steering axle, a plurality of independently movable grader supporting trucks connected to said traction engine, steering wheels for said trucks, connections between the pivoted axle of the traction engine and the steering wheels of the trucks, and means for shifting the axle of the traction engine.

19. In a machine of the character described, a traction engine, a plurality of independently movable grader supporting trucks connected to the traction engine, castor wheels journaled in said truck, steering mechanism for the traction engine, connections between the steering mechanism of the traction engine and the caster wheels of the trucks, and means for causing the caster wheels of said trucks to move in unison.

20. In a machine of the character described, a traction engine having a pivoted steering axle, a plurality of independently movable grader trucks connected to said traction engine, caster wheels journaled in said trucks, flexible connections extending from the pivoted axle of the traction engine and having a rotatable connection with the caster wheels of the trucks, and means for shifting the pivoted axle of the traction engine.

21. In a machine of the character described, a traction engine having a pivoted steering axle, a plurality of independently movable grader supporting trucks connected to the traction engine, caster wheels journaled in said trucks, crossed chains extending from the pivoted axle of the traction engine and having a rotatable connection with the caster wheels of the trucks, and connections between the caster wheels of the trucks for causing the same to move in unison.

22. In a machine of the character described, a traction engine, a plurality of independently movable grader supporting trucks connected to the traction engine, caster wheels journaled in said trucks, steering mechanism for the traction engine, connections between the steering mechanism of the traction engine and the caster wheels of the trucks, means for causing the caster wheels of said trucks to move in unison, and independent means for shifting one of said caster wheels.

23. In a machine of the character described, a traction engine having a pivoted steering axle, a plurality of independently movable grader trucks connected to said traction engine, caster wheels journaled in said trucks, flexible connections extending from the pivoted axle of the traction engine and having a rotatable connection with the caster wheels of the trucks, a flexible connection between the caster wheels of the trucks for causing the same to move in unison, and means for shifting one of said caster wheels.

24. In a machine of the character described, a traction engine including a power shaft and actuating mechanism therefor, steering mechanism for said traction engine, a plurality of independently movable trucks flexibly connected to said traction engine, steering mechanism for said trucks, connections between the steering mechanism of the traction engine and the steering mechanisms of the trucks, elevating mechanism supported upon said trucks, and gearing connecting the elevating mechanism and the power shaft of the traction engine.

25. In a machine of the character described, a traction engine, steering mechanism therefor, a plurality of independently movable grader supporting trucks connected to the traction engine, steering mechanisms for the trucks, connections between the steering mechanism of the traction engine and the steering mechanisms of the trucks, and means carried by the traction engine and by one of the trucks for actuating the steering mechanism of both the traction engine and trucks.

26. In a machine of the character described, a traction engine including a power shaft and actuating mechanism therefor, a pair of independently movable trucks flexibly connected to said traction engine, a plow beam pivotally connected at its forward end to the traction engine, means carried by one of said trucks for flexibly suspending said plow beam, an elevating carrier arranged transversely of said trucks, means carried by the plow truck for flexibly suspending the rear end of said carrier, means carried by the other truck for flexibly suspending the forward end of said carrier, and gearing connecting the power shaft of the traction engine with the elevating carrier.

27. In a machine of the character described, a plow, an elevating carrier adjacent said plow, and a mold board carried by the carrier and arranged to deliver the material raised by the plow onto the carrier.

28. In a machine of the character described, a plow, an elevating carrier having its lower end positioned adjacent said plow and provided with a bearing shoe, and a mold board carried by said bearing shoe and adapted to deliver the material raised by the plow onto said carrier.

29. In a machine of the character described, an adjustable plow, an elevating carrier having its lower end positioned adjacent said plow and provided with a bearing shoe, and a mold board adjustably secured to said bearing shoe.

30. In a machine of the character described, an elevating carrier comprising a frame, rollers journaled in the ends of said frame, an endless web traversing said rollers, driving belts traversing said rollers beyond the edges of the endless webs, and a plurality of slats secured to said webs and extending transversely thereof, the ends of said slats projecting beyond the edges of the web and being secured to the driving belts.

31. In a machine of the character described, an elevating carrier comprising a frame, rollers journaled in the ends of said frame, one of said rollers being provided at its ends with sprocket wheels and the other of said rollers being provided at its ends with smooth collars, an endless web supported by said rollers, chains engaging the sprocket wheels and collars on the ends of the rollers, and a plurality of slats secured to the web and extending transversely thereof, the ends of said slats being secured to said chains.

32. In a machine of the character described, an elevating carrier, and an angularly adjustable deflector board, positioned at the delivery end thereof, said board being adjustable to permit material to be discharged either rearwardly or forwardly of the end of the carrier.

33. In a machine of the character described, a link adjustably connecting one of said arms pivoted adjacent the discharge end thereof, a link adjustably connecting one of said arms and the frame of the carrier, a deflector board pivotally mounted intermediate the ends thereof between said arms, and a link connecting said deflector board and said first mentioned link.

34. In a machine of the character described, an elevating carrier, a pair of arms pivoted to the discharge end thereof, a deflector board, means for holding said board in various positions of angular adjustment between the outer ends of said arms, and means for angularly adjusting said arms.

35. In a machine of the character described, an elevating carrier, a pair of arms pivoted to the discharge end of said carrier, a deflector board pivotally mounted in the ends of said arms, means for securing the deflector board in various positions of adjustment between the ends of said arms, and a link adjustably connecting the arms and the frame of the carrier.

36. In a machine of the character described, a traction engine, an elevating carrier adjustably supported thereon and extending transversely thereacross, a plow supported from the traction engine, and a rigid connection between the plow and the lower end of the elevating carrier.

37. In a machine of the character described, a traction engine, an elevating carrier adjustably supported thereon and extending transversely thereacross, a plow supported from the traction engine, and an adjustable link connecting the plow and the lower end of the elevating carrier.

38. In a machine of the character described, a traction engine, a plurality of independently movable trucks connected thereto, an elevating carrier, links pivotally connecting one end of said carrier with one of said trucks, means adjustably connecting the other end of said carrier with the other of said trucks, and a plow positioned at one side of said elevating carrier and adapted to deliver material thereonto.

39. In a machine of the character described, a traction engine, a plurality of independently movable trucks connected thereto, an elevating carrier adjustably supported from said trucks, a plow positioned at one side of said elevating carrier, and a rigid connection between the plow and the lower end of the elevating carrier.

40. In a machine of the character described, a traction engine, a plurality of independently movable trucks connected thereto, an elevating carrier, links pivotally connecting one end of said carrier with one of said trucks, means adjustably connecting the other end of said carrier with the other of said trucks, and a link connecting the plow and the lower end of the elevating carrier.

41. In a machine of the character described, a traction engine, a plurality of independently movable trucks connected thereto, an elevating carrier, adjustable links pivotally connecting one end of said carrier with one of said trucks, means adjustably connecting the other end of said carrier with the other of said trucks, a plow positioned at one side of said carrier, and an adjustable link pivotally connecting said plow and the lower end of said carrier.

42. An elevating carrier having anti-friction devices secured to the under side of the forward end thereof.

43. An elevating carrier having elongated anti-friction rollers secured adjacent the delivery end thereof.

In testimony whereof we have signed our names to this specification in the presence of two subscribing witnesses.

LUTHER J. SEVISON.
EUGENE H. MOAK.

Witnesses:
  S. A. WOOD,
  A. F. WOOD.